United States Patent
Zhang et al.

(10) Patent No.: US 11,589,252 B2
(45) Date of Patent: Feb. 21, 2023

(54) CONFIGURATION FOR A CHANNEL MEASUREMENT RESOURCE (CMR) OR AN INTERFERENCE MEASUREMENT RESOURCE (IMR) TIME RESTRICTION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 17/115,319

(22) Filed: Dec. 8, 2020

(65) Prior Publication Data
US 2022/0182865 A1    Jun. 9, 2022

(51) Int. Cl.
| H04W 24/10 | (2009.01) |
| H04W 72/04 | (2009.01) |
| H04W 80/02 | (2009.01) |
| H04B 17/336 | (2015.01) |
| H04B 7/06 | (2006.01) |
| H04L 5/00 | (2006.01) |
| H04B 17/318 | (2015.01) |
| H04W 72/0446 | (2023.01) |

(52) U.S. Cl.
CPC .......... *H04W 24/10* (2013.01); *H04B 7/0626* (2013.01); *H04B 17/318* (2015.01); *H04B 17/336* (2015.01); *H04L 5/0051* (2013.01); *H04W 72/042* (2013.01); *H04W 72/0446* (2013.01); *H04W 80/02* (2013.01)

(58) Field of Classification Search
CPC ..... H04W 24/10; H04W 24/06; H04W 24/08; H04W 72/042; H04W 72/0446; H04W 72/04; H04W 80/02; H04B 17/318; H04B 17/336; H04B 7/0626; H04L 5/0051
USPC .................................................. 370/329–330
See application file for complete search history.

(56) References Cited

U.S. PATENT DOCUMENTS

| 2018/0262313 A1* | 9/2018 | Nam ................. H04W 72/0446 |
| 2020/0145866 A1* | 5/2020 | Onggosanusi ........ H04W 24/10 |
| 2020/0220631 A1 | 7/2020 | Onggosanusi et al. |
| 2021/0028843 A1* | 1/2021 | Zhou .................... H04B 7/0626 |
| 2021/0099271 A1* | 4/2021 | Zhang .................... H04B 7/063 |

(Continued)

OTHER PUBLICATIONS

International Search Report and Written Opinion—PCT/US2021/072439—ISA/EPO—dated Mar. 14, 2022.

(Continued)

*Primary Examiner* — Candal Elpenord
(74) *Attorney, Agent, or Firm* — Norton Rose Fullbright US LLP

(57) ABSTRACT

This disclosure provides systems, methods, and devices for wireless communication that support a configuration for a measurement resource. In a first aspect, a method of wireless communication includes receiving a medium access control-control element (MAC-CE) or downlink control information (DCI) that indicates a configuration for a channel measurement resource (CMR) time restriction, an interference measurement resource (IMR) time restriction, or a combination thereof. The method also includes transmitting a report based on the configuration. Other aspects and features are also claimed and described.

30 Claims, 5 Drawing Sheets

(56) References Cited

U.S. PATENT DOCUMENTS

2021/0329482 A1* 10/2021 Yoon .................. H04B 7/088
2021/0409174 A1* 12/2021 Yum .................. H04L 25/0202

OTHER PUBLICATIONS

Samsung: "Enhancements on MIMO for NR", 3GPP Draft, 3GPP TSG RAN Meeting #86, RP-193194, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019 Dec. 11, 2019 (Dec. 11, 2019), XP051839150, pp. 1-29, Retrieved from the Internet: URL: https://ftp.3gpp.org/tsg_ran/TSG_RAN/TSGR_86/Docs/RP-193194. zip RP-193194 SR for RAN_86_NR-eMIMO—rev.docx [retrieved on Dec. 11, 2019] pp. 24-27.

* cited by examiner

CONFIGURATION FOR A CHANNEL MEASUREMENT RESOURCE (CMR) OR AN INTERFERENCE MEASUREMENT RESOURCE (IMR) TIME RESTRICTION

TECHNICAL FIELD

Aspects of the present disclosure relate generally to wireless communication systems, and more particularly, to a configuration for a measurement resource, such as a channel measurement resource (CMR) or an interference measurement resource (IMR). Some features may enable and provide improved communications, including dynamic configuration for CMR time restriction, dynamic configuration for IMR time restriction, reduced latency, reduced overhead, improved beam management, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving a medium access control-control element (MAC-CE) or downlink control information (DCI) that indicates a configuration for a channel measurement resource (CMR) time restriction, an interference measurement resource (IMR) time restriction, or a combination thereof. The method further includes transmitting a report based on the configuration.

In an additional aspect of the disclosure, an apparatus configured for wireless communication is disclosed. The apparatus includes at least one processor, and a memory coupled to the at least one processor. The at least one processor is configured to receive an MAC-CE or DCI that indicates a configuration for a CMR time restriction, an IMR time restriction, or a combination thereof. The at least one processor is further configured to initiate transmission of a report based on the configuration.

In an additional aspect of the disclosure, an apparatus configured for wireless communication is disclosed. The apparatus includes means for receiving an MAC-CE or DCI that indicates a configuration for a CMR time restriction, an IMR time restriction, or a combination thereof. The apparatus further includes means for transmitting a report based on the configuration.

In an additional aspect of the disclosure, a non-transitory computer-readable medium stores instructions that, when executed by a processor, cause the processor to perform operations including receiving an MAC-CE or DCI that indicates a configuration for a CMR time restriction, an IMR time restriction, or a combination thereof. The operations further include initiating transmission of a report based on the configuration.

In an additional aspect of the disclosure, a method of wireless communication includes determining a configuration for a CMR time restriction, an IMR time restriction, or a combination thereof receiving. The method further includes generating a message including an MAC-CE or DCI that indicates the configuration. The method also includes transmitting the message.

In an additional aspect of the disclosure, an apparatus configured for wireless communication is disclosed. The apparatus includes at least one processor, and a memory coupled to the at least one processor. The at least one processor is configured to determine a configuration for a CMR time restriction, an IMR time restriction, or a combination thereof receiving. The at least one processor is further configured to generate a message including an MAC-CE or DCI that indicates the configuration, and initiate transmission of the message.

In an additional aspect of the disclosure, an apparatus configured for wireless communication is disclosed. The apparatus includes means for determining a configuration for a CMR time restriction, an IMR time restriction, or a combination thereof receiving. The apparatus further includes means for generating a message including an MAC-CE or DCI that indicates the configuration. The apparatus also includes means for transmitting the message.

In an additional aspect of the disclosure, a non-transitory computer-readable medium stores instructions that, when executed by a processor, cause the processor to perform operations including determining a configuration for a CMR time restriction, an IMR time restriction, or a combination thereof receiving. The operations further include generating a message including an MAC-CE or DCI that indicates the configuration, and initiating transmission of the message.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
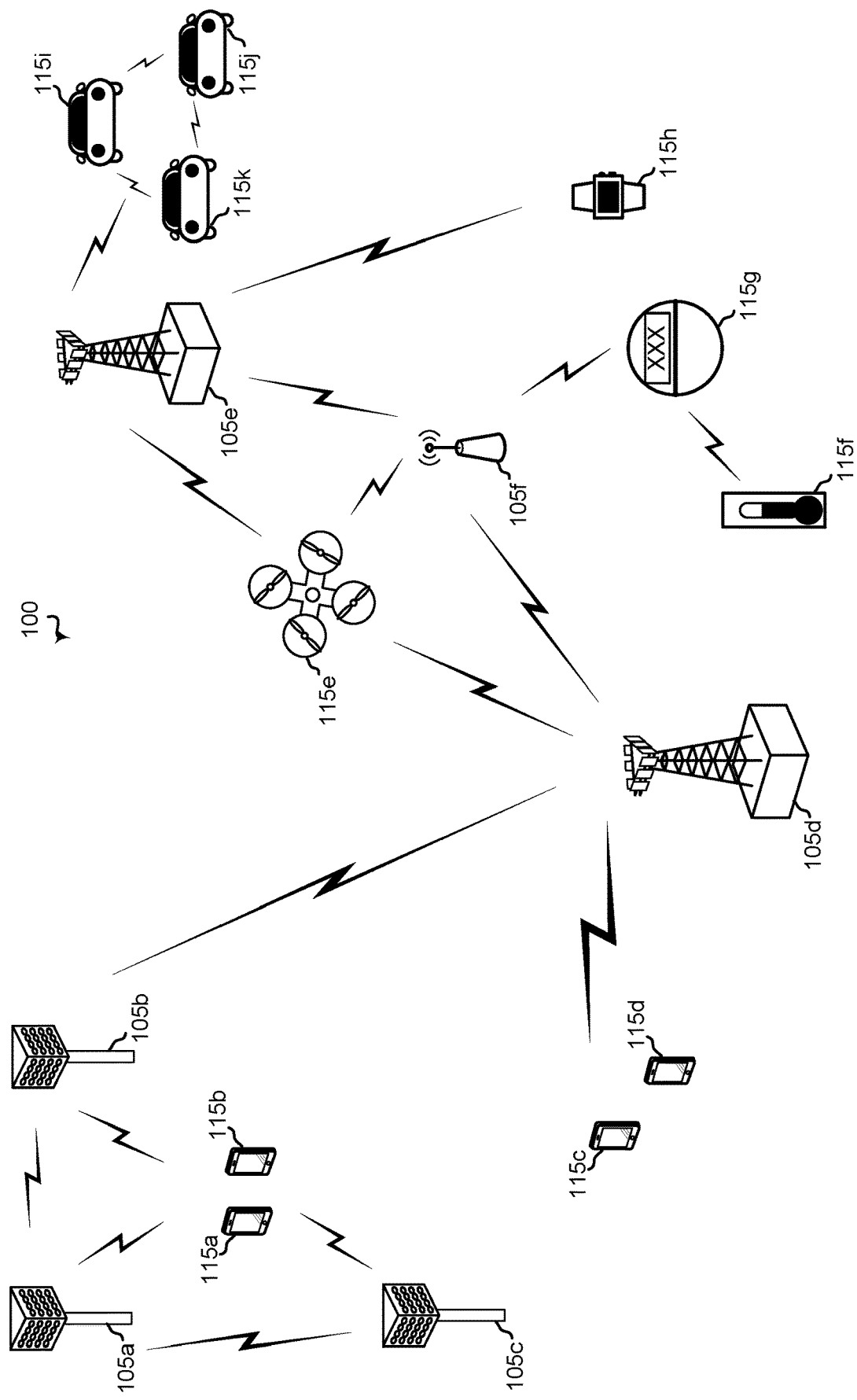
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In 3rd Generation Partnership Project (3GPP) specification, Release 15 or 16, channel measurement resource (CMR) time filtering and interference measurement resource (IMR) time filtering is configured via radio resource control (RRC) signaling, such as a channel state information (CSI) report configuration information element. For example, in technical specification 32.214, each of CMR time filtering and IMR filtering may be configured (or not configured) via a corresponding timeRestriction parameter which enables (or disables) time domain restriction. To illustrate, the time domain restriction may indicate to only use latest sample to do time average if time restriction is configured. Otherwise, a previous number of samples may be used to average the CMR or the IMR. The CMR, the IMR, or both may support beam management associated with a layer 1 (L1) receive signal reference power (RSRP) or L1 signal to interference and noise ratio (SINR) for periodic or semi-persistent CMR periodic or semi-persistent IMR, or both. However, configuring (or not configuring) the time restriction and enabling or not enabling time filtering parameters, such as adjusting time filtering parameters, is limited to RRC signaling which can be time consuming.

The present disclosure provides systems, apparatus, methods, and computer-readable media that support a configuration for a measurement resource, such as a channel measurement resource (CMR) or an interference measurement resource (IMR). For example, the present disclosure may provide a dynamic configuration for CMR time restriction, IMR time restriction, or a combination thereof. To illustrate, the CMR time restriction, the IMR time restriction, or a combination thereof, may be configured via a medium access control-control element (MAC-CE) or downlink control information (DCI). The MAC-CE or the DCI may transmitted by a base station to a user equipment (UE) and may include or indicate a configuration. In some implementations, the configuration may indicate one or more parameters, such as a CMR parameter that indicates whether the CMR time restriction is configured or not configured, an IMR parameter that indicates whether the IMR time restriction is configured or not configured, or a combination thereof. Additionally, or alternatively, the one or more parameters may indicate a number of samples to average if CMR time restriction or IMR time restriction is configured (enabled). For example, if time restriction is configured for CRM or IRM, the configuration may include a number of samples to average or filter. Accordingly, the MAC-CE or the DCI may dynamically configure or update one or more time restriction parameters for CMR, IMR, or a combination thereof, one or more time filtering parameters, or a combination thereof. Based on the configuration for the CMR or the IMR, the UE may generate a report, such as a channel state information (CSI) report, that is transmitted to the base station. The report may indicate a receive signal reference power (RSRP), a signal to interference and noise ratio (SINR), or a combination thereof, as illustrative, non-limiting examples.

Particular implementations of the subject matter described in this disclosure may be implemented to realize one or more of the following potential advantages or benefits. In some aspects, the present disclosure provides techniques for configuration of a measurement resource may be dynamically provided via a MAC-CE or DCI and may have less latency as compared to use of RRC to configure the measurement resource. Additionally, or alternatively, a message for configuration of a measurement resource may indicate a number of samples to average if a resource is configured such that a base station may activate averaging or filtering over a specified number of CSI-RS resources or CSI-RS slots for a given CSI report.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
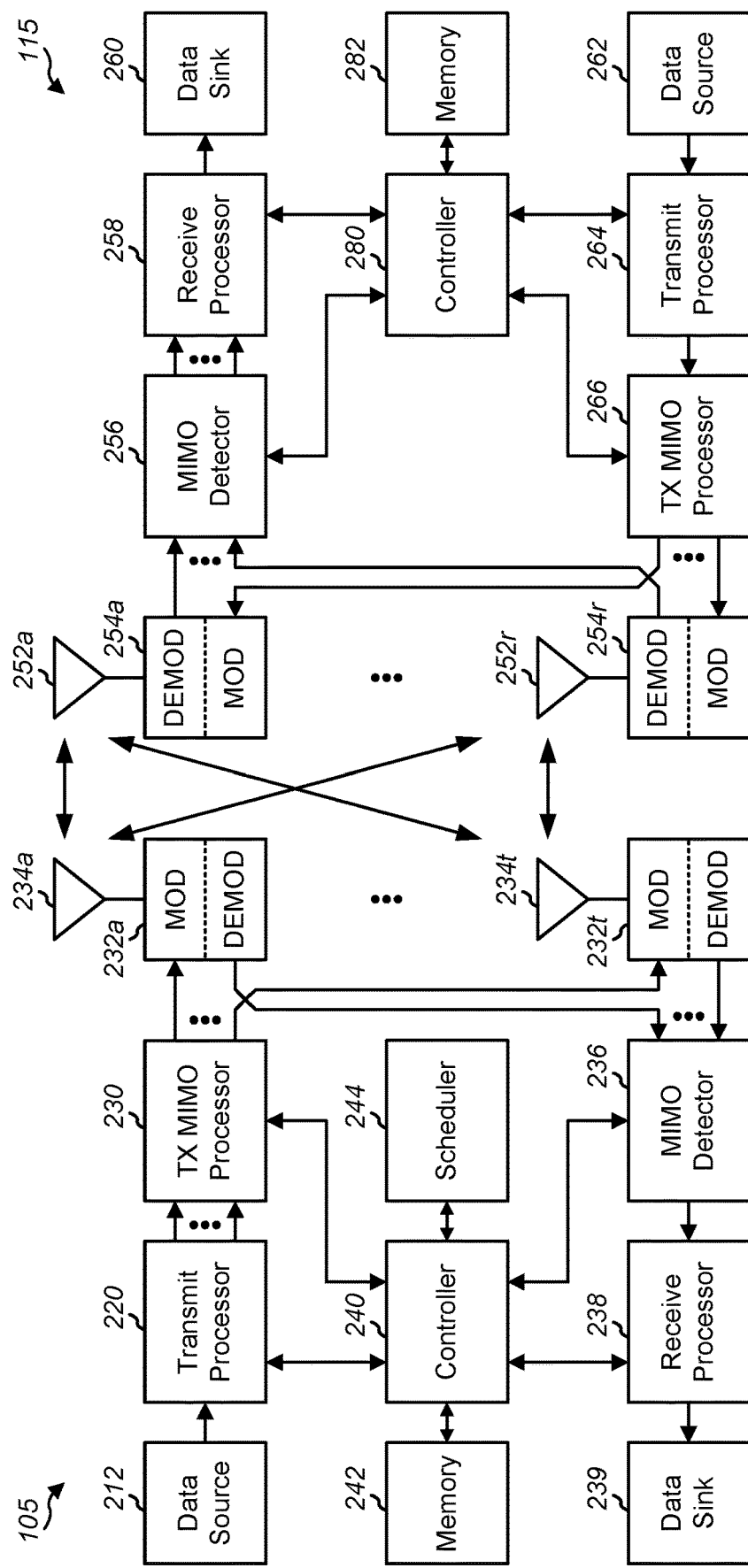
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4 or 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
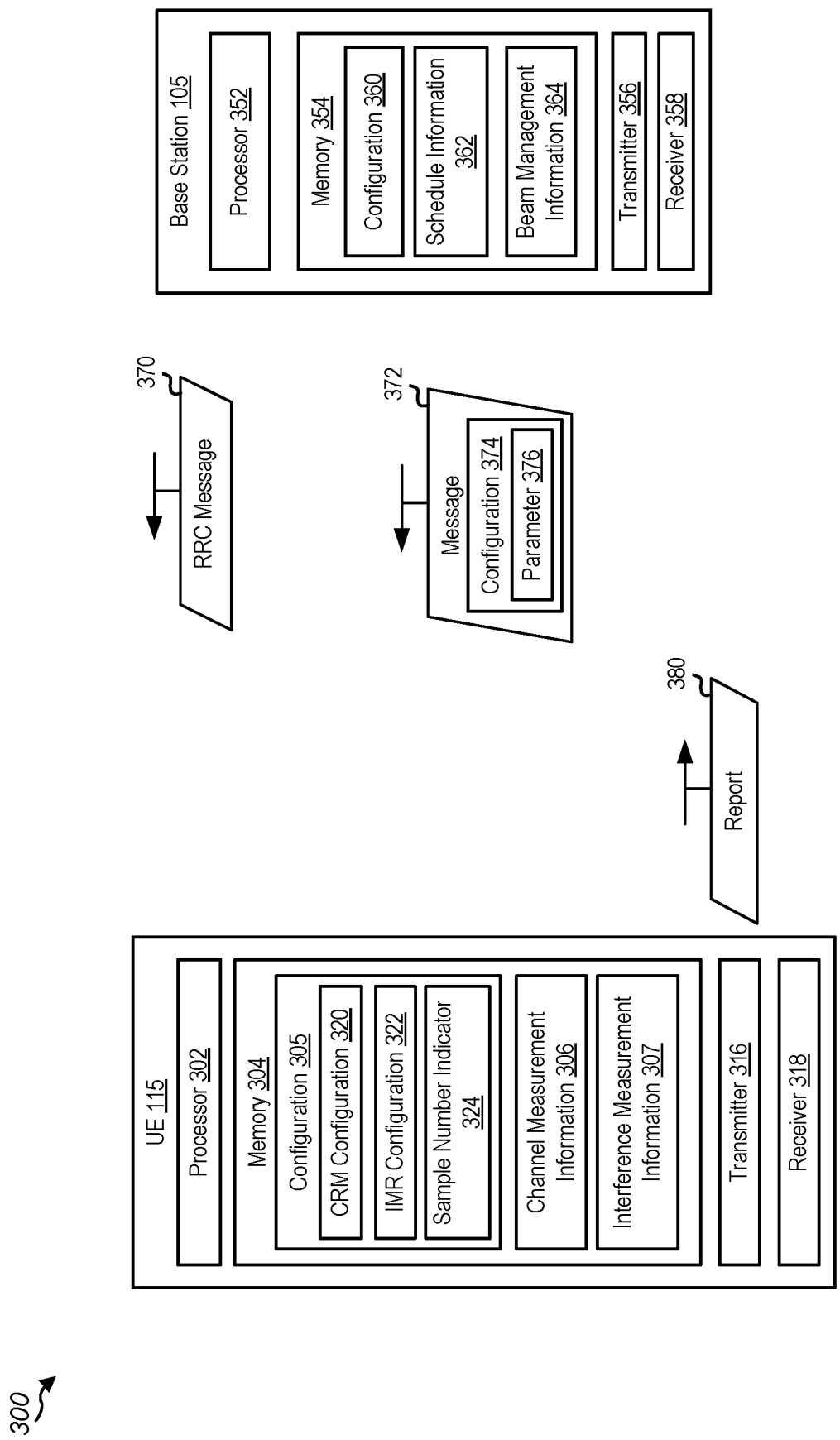
FIG. 3 is a block diagram illustrating an example wireless communication system that supports a configuration for a measurement resource according to one or more aspects.

FIG. 3 is a block diagram of an example wireless communications system 300 that supports a configuration for a measurement resource according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store a configuration 305, channel measurement information 306, and interference measurement information 307. Configuration 305 is a configuration for a measurement resource, such as a CMR or an IMR. For example, the configuration may indicate whether or not a CMR time restriction is configured (or not configured), an IMR time restriction is configured (or not configured), or a combination thereof. Configuration 305 may include a CMR configuration 320, an IMR configuration 322, and a sample number indicator 324. CMR configuration 320 may indicate one or more CMRs, whether the CMR is configured or not configured for time restriction, whether CMR time filtering is enabled (or not enabled), or a combination thereof. IMR configuration 322 may indicate one or more IMRs, whether the IMR is configured or not configured for time restriction, whether IMR time filtering is enabled (or not enabled), or a combination thereof. Sample number indicator 324 may include a number of samples to average or filter for CMR time filtering, IMR time filtering, or a combination thereof. In some implementations, configuration 305 may include or indicate a number of channel state information reference signal (CSI-RS) resources or a number of CSI-RS slots for the UE to use to generate a report, such as a CSI report. Additionally, or alternatively, configuration 305 may include a beam indicator that indicates a transmit (Tx) beam of the base station, such as the Tx beam of the base station corresponds to a receive (Rx) beam of the UE.

Channel measurement information 306 may include or indicate one or more values associated with one or more CMRs. For example, channel measurement information 306 may include an average of one or more CMRs, an RSRP based on the averaged one or more CMRs, or a combination thereof. In some implementations, the one or more CMRs may be averaged in a Layer 1 (L1), the one or more CMRs may be periodic or semi-persistent, or a combination thereof.

Interference measurement information 307 may include or indicate one or more values associated with one or more CMRs. For example, interference measurement information 307 may include an average of one or more IMRs, an SINR based on the averaged one or more IMRs, or a combination thereof. In some implementations, the one or more IMRs may be averaged in a L1, the one or more IMRs may be periodic or semi-persistent, or a combination thereof.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store a configuration 360, schedule information 362, and beam management information 364. Configuration 360 may include or correspond to configuration 305. Schedule information 362 may be associated with a beam sweep, such as a Tx beam sweep of different narrow beams to the same UE Rx beam. In some implementations, schedule information 362 may be generated based on configuration 360. Alternatively, configuration 360 may be generated based on schedule information 362. Beam management information 364 may include or indicate one or more values received from UE 115. For example, the one or more values may be determined by UE 115 based on configuration 305 or 360. In some implementations, base station 105 may receive the one or more values from UE 115 in a report, such as a CSI report.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 may transmit an RRC message 370 to UE 115. In some implementations, RRC message 370 may be configured to enable a time domain restriction, such as a CMR time restriction, an IMR time restriction, or a combination thereof. For example, RRC message 370 may include a time restriction parameter to configure (or not configure) the CMR time restriction, the IMR time restriction, or a combination thereof. If the time domain restriction is configured (e.g., enabled), UE 115 may only use a latest sample to perform a time average operation. If the dime domain restriction is not enabled, UE 115 may use one or more previous samples to average CMR or IMR in L1-RSRP or L1-SINR for persistent (P) or semi-persistent (SP) resource measurements, such as CMR measurements, IMR measurements, or a combination thereof.

As an illustrative, non-limiting example, RRC message 370 may include a report configuration information element, such as a CSI-ReportConfig information element. The report configuration information element may include a first parameter, such as a timeRestrictionForChannelMeasurements parameter, for CMR, a second parameters, such as timeRestrictionForInterferenceMeasurements, for IMR, or a combination thereof. For example, the timeRestrictionForChannelMeasurements parameter may be ENUMERATED {configured, noConfigured}. As another example, the timeRestrictionForInterferenceMeasurements may be ENUMERATED {configured, noConfigured}. If the first parameter indicates that the time restriction is configured, RRC message 370 may indicate a number of samples to do time average or time filtering—e.g., a number of one may be a default value, may indicate to only use the latest sample, or a combination thereof. If the first parameter indicates that the time restriction is not configured, a previous number of samples may be used to average the CMR and the previous number may be indicated in RRC message 370 or may be determined based on a standard. If the second parameter indicates that the time restriction is configured, RRC message 370 may indicate a number of samples to do time average or time filtering. If the first parameter indicates that the time restriction is not configured, a previous number of samples may be used to average the IMR and the previous number may be indicated in RRC message 370 or may be determined based on a standard.

In some implementations, if UE 115 is not configured with higher layer parameter timeRestrictionForChannelMeasurements, UE 115 may derive the channel measurements for computing a CSI value reported in uplink slot n (wherein n is a positive integer) based on only the non-zero-power (NZP) CSI-RS, no later than a CSI reference resource associated with the CSI resource setting. Alternatively, if UE 115 is configured with higher layer parameter timeRestrictionForChannelMeasurements in CSI-ReportConfig, UE 115 may derive the channel measurements for computing CSI reported in uplink slot n based on only the most recent, no later than the CSI reference resource, occasion of NZP CSI-RS associated with the CSI resource setting.

In some implementations, if UE 115 is not configured with higher layer parameter timeRestrictionForinterferenceMeasurements, UE 115 may derive the interference measurements for computing CSI value reported in uplink slot n based on only the CSI-IM and/or NZP CSI-RS for interference measurement no later than the CSI reference resource associated with the CSI resource setting. Alternatively, if UE 115 is configured with higher layer parameter timeRestrictionForinterferenceMeasurements in CSI-ReportConfig, UE 115 may derive the interference measurements for computing the CSI value reported in uplink slot n based on the most recent, no later than the CSI reference resource, occasion of CSI-IM or NZP CSI-RS for interference measurement associated with the CSI resource setting.

After transmission of RRC message 370, base station 105 may determine configuration 360. For example, base station 105 may determine a configuration for a CMR time restriction, an IMR time restriction, or a combination thereof. Although described as base station 105 determining configuration 360 after transmission of RRC message 370, in other implementations, base station 105 may determine configuration 360 without previously sending RRC message 370, such as an RRC message that enables a time domain restriction, such as a CMR time restriction, an IMR time restriction, or a combination thereof.

Base station 105 may generate a message 372 including an MAC-CE or DCI that indicates the determined configuration 360. For example, message 372 may include a configuration 374 that corresponds to configuration 360 determined by base station 105. Message 372 may enable base station 105 to dynamically configure or update one or more time restriction parameters for CMR, IMR, or both, time filtering parameters, or a combination thereof, without having to use an RRC message.

Configuration 374 may include one or more parameters 376 (hereinafter referred to collectively as "parameter 376"). For example, parameter 376 may indicate whether the a CMR time restriction is configured or not configured, the IMR time restriction is configured or not configured, or a combination thereof. In some implementations, the MAC-CE or the DCE may include a first parameter, such as timeRestrictionForChannelMeasurements ENUMERATED {configured, noConfigured}, a second parameter, such as timeRestrictionForInterferenceMeasurements may be ENUMERATED {configured, noConfigured}, or a combination thereof. Additionally, or alternatively, parameter 376 may indicate a number of samples to average if UE 115 is to be configured for time restriction. Accordingly, base station 105 may dynamically activate averaging or filtering over a specified number of CSI-RS resources or CSI-RS slots for a given CSI report. For example, if base station 105 wants UE 115 to average over three samples, such as the three most recent samples, parameter 376 may indicate three samples are to be averaged. In this manner, UE 115 will know which samples to average for CSI-RS to calculate the CMR RSRP, or signal to noise ratio (SNR). It is noted that to determine SNR, interference is determined using IMR and SNR is calculated as the CMR measurement divided by the IMR measurement. In some implementations, parameter 376 that indicates the number of samples to average (or filter) may be included in an RRC message, such as RRC message 370.

UE 115 may receive message 372 and may generate or update configuration 305 based on configuration 374 included in the received message 372. After receiving message 372 and determining configuration 374 (e.g., configuration 305), UE 115 may perform one or more channel measurements, one or more interference measurements, or a combination thereof, based on configuration 305. For example, UE 115 may perform the one or more channel measurements and update channel measurement information 306 based on the one or more channel measurements. Based on the one or more channel measurements, UE 115 may average one or more CMRs and determine a receive signal reference power (RSRP) based on the averaged one or more CMRs. In some implementations, UE 115 may filter a number of samples to be averaged. As another example, UE 115 may perform the one or more interference measurements and update interference measurement information 307 based on the one or more interference measurements. Based on the one or more interference measurements, UE 115 may average one or more IMRs and determine a signal to interference and noise ratio (SINR) based on the averaged one or more IMRs. In some implementations, UE 115 may filter a number of samples to be averaged.

UE 115 may generate a report 380 that an indication of an RSRP, an indication of an SINR, an indication of SNR, or a combination thereof. UE 115 may transmit report 380 to base station 105. Base station 105 may receive report 380 and update beam management information 364 based on one or indications included in report 380.

In some implementations, an Rx beam of UE 115 is fixed and may be quasi co-located (QCL) for CMR and IMR. Additionally, a Tx beam of base station 105 may change, such as to perform a beam sweep to test beam quality of different narrow Tx beams. To perform the beam sweep, base station 105 determines configuration 360 for UE to prohibit averaging over multiple CMR or IMR occasions on different Tx beams so that any averaging is performed for the same beam, such as one beam. To illustrate, base station 105 may beam sweep according to schedule information 362 which indicates that base station 105 is to transmit CMR occasions 1,2,3 via a first Tx narrow beam 1, and transmit CMR occasions 4,5,6 via a second Tx narrow beam 2. According, base station 105 determines configuration 360 (corresponding to configuration 374) to direct UE 115 to average over occasions 4,5,6 only for second Tx narrow beam 2 if base station 105 wants information for occasions 4, 5, 6 for the second Tx narrow beam 2.

As described with reference to FIG. 3, the present disclosure provides techniques for configuration of a measurement resource may be dynamically provided via a MAC-CE or DCI and may have less latency as compared to use of RRC to configure the measurement resource. For example, a MAC-CE or DCI may dynamically configure or update one or more time restriction parameters for CMR, IMR, or both, time filtering parameters, or a combination thereof, without having to use an RRC message. Additionally, or alternatively, a message for configuration of a measurement resource may indicate a number of samples to average if a resource is configured such that a base station may activate averaging or filtering over a specified number of CSI-RS resources or CSI-RS slots for a given CSI report.

Figure 4:
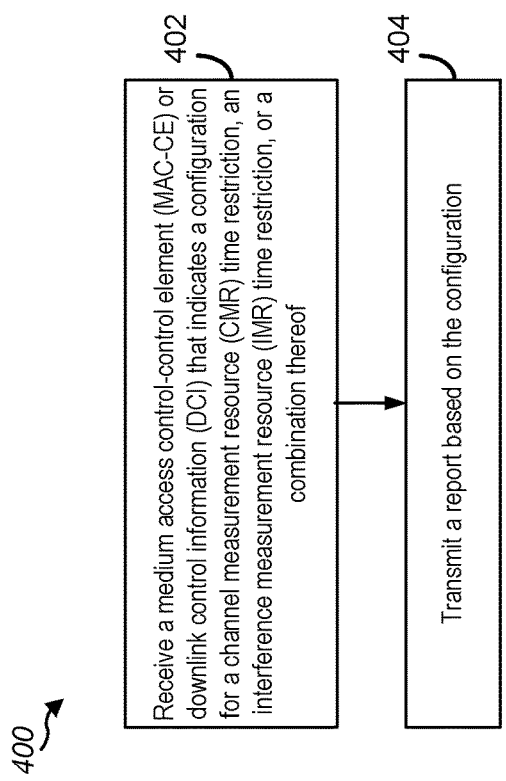
FIG. 4 is a flow diagram illustrating an example process that supports a configuration for a measurement resource according to one or more aspects.

FIG. 4 is a flow diagram illustrating an example process 400 that supports a configuration for a measurement resource according to one or more aspects. Operations of process 400 may be performed by a UE, such as UE 115 described above with reference to FIGS. 1, 2, 3, or a UE described with reference to FIG. 5. For example, example operations (also referred to as "blocks") of process 400 may enable UE 115 to support a configuration for a measurement resource.

In block 402, the UE receives an MAC-CE or DCI that indicates a configuration for a CMR time restriction, an IMR time restriction, or a combination thereof. The MAC-CE or the DCI may be received in a message, such as message 372. The configuration may include or correspond to configuration 305, 360, or 374.

In some implementations, the configuration includes a parameter. The parameter may include or correspond to parameter 376. The parameter may include a timeRestriction parameter. The timeRestriction parameter may be included in a CSI-report configuration field, such as a CSI-report configuration field of the MAC-CE or the DCI. Additionally, or alternatively, the parameter may indicate whether the CMR time filtering is configured or not configured (enabled or not enabled), the IMR time filtering is configured or not configured (enabled or not enabled), or a combination thereof. For example, the parameter may include a CMR parameter to enable the CMR time filtering. As another example, the parameter may include an IMR parameter to enable the IMR time filtering. The CMR parameter, the IMR parameter, or both, may be included in a CSI-report configuration field, such as a CSI-report configuration field of the MAC-CE or the DCI. In some implementations, the configuration may include a beam indicator that indicates a Tx beam of the base station. The Tx beam of the base station may correspond to an Rx beam of the UE.

In block 404, the UE transmits a report based on the configuration. The report may include or correspond to report 380. In some implementations, the report includes a CSI report.

In some implementations, the configuration includes a sample number indicator that indicates a number of samples to average for the CMR time averaging or filtering, the IMR time filtering or filtering, or a combination thereof. The sample number indicator may include or correspond to sample number indicator 324. Additionally, or alternatively, the configuration may indicate a number of CSI-RS resources or a number of CSI-RS slots for the UE to use to generate a report.

In some implementations, when the configuration indicates time filtering is enabled, the UE may be prohibited from averaging over multiple CMR occasions, averaging over multiple IMR occasions, or a combination thereof, on different Tx beams of the base station. Alternatively, in some other implementations, when the configuration indicates time filtering is enabled, the UE is limited to averaging CMR, IMR, or a combination thereof, to one Tx beam of the base station. In some implementations, an indication that time restriction is configured also may indicate that time averaging or filtering is enabled.

In some implementations, the UE may, based on the configuration, perform a channel measurement, an interference measurement, or a combination thereof. Based on performing the channel measurement, the UE may store channel measurement information, such as channel measurement information 306. Additionally, or alternatively, based on performing the interference measurement, the UE may store interference measurement information, such as interference measurement information 307.

In some implementations, the UE may average one or more CMRs. The one or more CMRs may be periodic or semi-persistent. Additionally, or alternatively, the UE may average the one or more CMRs in an L1. Based on the averaged one or more CMRs, the UE may determine an RSRP.

In some implementations, the UE may average one or more IMRs. The one or more IMRs may be periodic or semi-persistent. Additionally, or alternatively, the one or more IMRs may be averaged in an L1. Based on the averaged one or more IMRs, the UE may determine an SINR.

Figure 5:
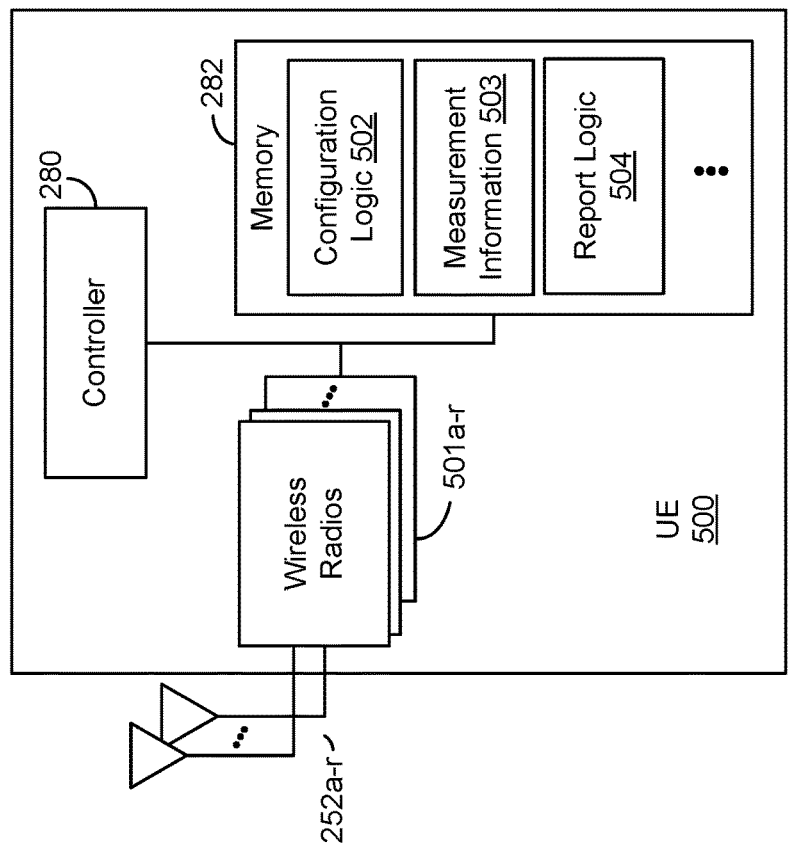
FIG. 5 is a block diagram of an example UE that supports a configuration for a measurement resource according to one or more aspects.

FIG. 5 is a block diagram of an example UE 500 that supports a configuration for a measurement resource according to one or more aspects. UE 500 may be configured to perform operations, including the blocks of process 400 described with reference to FIG. 4. In some implementations, UE 500 includes the structure, hardware, and components shown and described with reference to UE 115 of FIGS. 1-3. For example, UE 500 includes controller 280, which operates to execute logic or computer instructions stored in memory 282, as well as controlling the components of UE 500 that provide the features and functionality of UE 500. UE 500, under control of controller 280, transmits and receives signals via wireless radios 501a-r and antennas 252a-r. Wireless radios 501a-r include various components and hardware, as illustrated in FIG. 2 for UE 115, including modulator and demodulators 254a-r, MIMO detector 256, receive processor 258, transmit processor 264, and TX MIMO processor 266.

Figure 7:
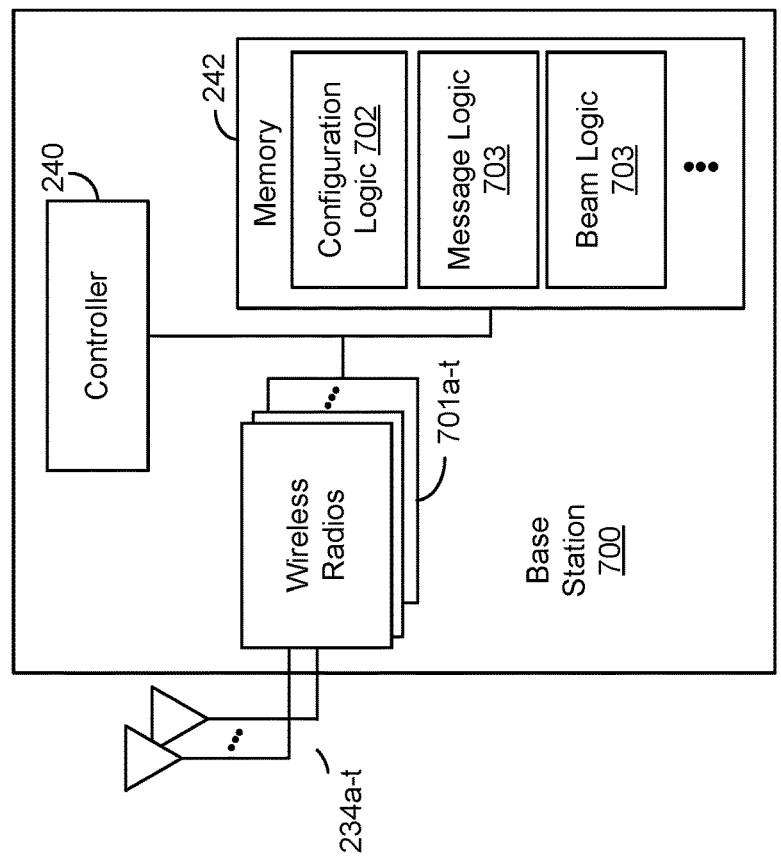
FIG. 7 is a block diagram of an example base station that supports a configuration for a measurement resource according to one or more aspects.

As shown, memory 282 may include configuration logic 502, measurement information 503, and report logic 504. Configuration logic 502 may be configured to configure one or more resources of UE 500, such as a CMR, an IMR, or a combination thereof. Measurement information 503 may include or correspond to channel measurement information 306, interference measurement information, or a combination thereof. Report logic 504 may be configured to generate a report, such as report 380. UE 500 may receive signals from or transmit signals to one or more network entities, such as base station 105 of FIG. 1-3 or a base station as illustrated in FIG. 7.

Figure 6:
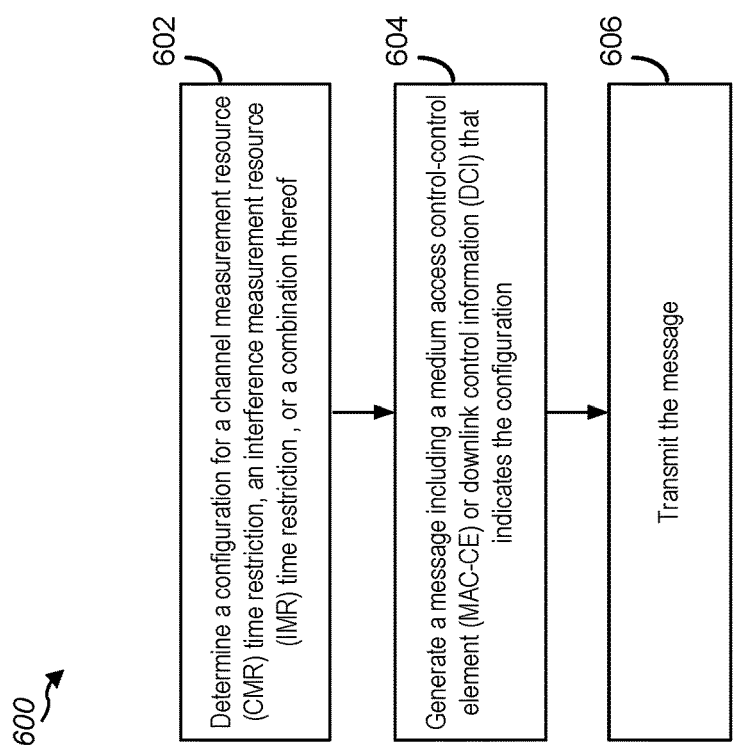
FIG. 6 is a flow diagram illustrating an example process that supports a configuration for a measurement resource according to one or more aspects.

FIG. 6 is a flow diagram illustrating an example process 600 that supports a configuration for a measurement resource according to one or more aspects. Operations of process 600 may be performed by a base station, such as base station 105 described above with reference to FIG. 1-3 or a base station as described above with reference to FIG. 7. For example, example operations of process 600 may enable base station 105 to support a configuration for a measurement resource.

At block 602, the base station determines a configuration for a CMR time restriction, an IMR time restriction, or a combination thereof. The configuration may include or correspond to configuration 305, 360, or 374.

In some implementations, the configuration includes a parameter, such as parameter 376. The parameter may include a timeRestriction parameter. Additionally, or alternatively, the parameter may indicate whether the CMR time restriction is configured or not configured, the IMR time restriction is configured or not configured, or a combination thereof. For example, the parameter may include a CMR parameter to enable CMR time filtering. As another example, the parameter may include an IMR parameter to enable IMR time filtering. The CMR parameter, the IMR parameter, or both, may be included in a CSI-report configuration field, such as a CSI-report configuration field of the MAC-CE or the DCI. In some implementations, the configuration may include a beam indicator that indicates a Tx beam of the base station. The Tx beam of the base station may correspond to an Rx beam of the UE.

At block 604, the base station generates a message including an MAC-CE or DCI that indicates the configuration. The message may include or correspond to message 372. At block 606, the base station transmits the message.

In some implementations, the base station transmits one or more CMRs, transmits one or more IMRs, or a combination thereof. For example, the base station may transmit the one or more CMRs, the one or more IMRs, or the combination thereof after transmission of the configuration. The one or more CMRs may be periodic or semi-persistent, the one or more IMRs may be periodic or semi-persistent, or a combination thereof.

In some implementations, the base station may receive, based on the configuration, a report. The report may include or correspond to report 380. the report may include an indication of an RSRP, an indication of a SINR, or a combination thereof. In some implementations, the report includes a CSI report.

In some implementations, the configuration includes a sample number indicator, such as sample number indicator 324. The sample number indicator may indicate a number of samples to average or filter. Additionally, or alternatively, the configuration may indicate a number of CSI-RS resources or a number of CSI-RS slots for the UE to use to generate the report.

In some implementations, when the configuration indicates time filtering is enabled, the UE may be prohibited from averaging over multiple CMR occasions, averaging over multiple IMR occasions, or a combination thereof, on different Tx beams of the base station. In some other implementations, when the configuration indicates time filtering is enabled, the UE may be limited to averaging CMR, IMR, or a combination thereof, to one Tx beam of the base station.

FIG. 7 is a block diagram of an example base station 700 that supports a configuration for a measurement resource according to one or more aspects. Base station 700 may be configured to perform operations, including the blocks of process 600 described with reference to FIG. 6. In some implementations, base station 700 includes the structure, hardware, and components shown and described with reference to base station 105 of FIGS. 1-3. For example, base station 700 may include controller 240, which operates to execute logic or computer instructions stored in memory 242, as well as controlling the components of base station 700 that provide the features and functionality of base station 700. Base station 700, under control of controller 240, transmits and receives signals via wireless radios 701a-t and antennas 734a-t. Wireless radios 701a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include configuration logic 702, message logic 703, and beam logic 704. Configuration logic 702 may be configured to determine a configuration for CMR time filtering, IMR time filtering, or a combination thereof. Message logic 703 may be configured to generate a message including an MAC-CE or DCI that indicates the configuration. In some implementations, the message logic 703 may initiate transmission of the logic. Beam logic 704 may be configured to perform one or more beam management operations. For example, beam logic 704 may select a beam configuration, perform a beam sweep, or a combination thereof. Base station 700 may receive signals from or transmit signals to one or more UEs, such as UE 115 of FIG. 1-3 or UE 500 of FIG. 5.

It is noted that one or more blocks (or operations) described with reference to FIGS. 4 and 6 may be combined with one or more blocks (or operations) described with reference to another of the figures. For example, one or more blocks (or operations) of FIG. 4 may be combined with one or more blocks (or operations) of FIG. 6. As another example, one or more blocks associated with FIG. 4 or 6 may be combined with one or more blocks (or operations) associated with FIG. 1-3. Additionally, or alternatively, one or more operations described above with reference to FIGS. 1-3 may be combined with one or more operations described with reference to FIG. 5 or 7.

In one or more aspects, techniques for supporting a configuration for a measurement resource may include additional aspects, such as any single aspect or any combination of aspects described below or in connection with one or more other processes or devices described elsewhere herein. In a first aspect, supporting a configuration for a measurement resource may include an apparatus configured to receive an MAC-CE or DCI that indicates a configuration for a CMR time restriction, an IMR time restriction, or a combination thereof. The apparatus is further configured to transmit a report based on the configuration. Additionally, the apparatus may perform or operate according to one or more aspects as described below. In some implementations, the apparatus includes a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the configuration includes a parameter that indicates whether the CMR time restriction is configured or not configured, the IMR time restriction is configured or not configured, or a combination thereof.

In a third aspect, in combination with the second aspect, the parameter includes a timeRestriction parameter. The parameter may be included in a CSI-report configuration field of a MAC-CE or DCI.

In a fourth aspect, in combination with one or more of the second aspect or the third aspect, the parameter includes a CMR parameter to enable CMR time filtering.

In a fifth aspect, in combination with the fourth aspect, the CMR parameter is includes in a CSI-report configuration field.

In a sixth aspect, in combination with one or more of the second aspect through the fifth aspect, the parameter includes an IMR parameter to enable IMR time filtering.

In a seventh aspect, in combination with the sixth aspect, the IMR parameter is included in a CSI-report configuration field.

In an eighth aspect, in combination with one or more of the first aspect through the seventh aspect, the configuration includes a sample number indicator that indicates a number of samples to average for the CMR time filtering, the IMR time filtering, or a combination thereof.

In a ninth aspect, in combination with one or more of the first aspect through the eighth aspect, the configuration indicates a number of CSI-RS resources or a number of CSI-RS slots for the apparatus to use to generate the report.

In a tenth aspect, in combination with one or more of the first aspect through the ninth aspect, the report includes a CSI report.

In an eleventh aspect, in combination with one or more of the first aspect through the tenth aspect, the configuration includes a beam indicator that indicates a Tx beam of the base station, the Tx beam of the base station corresponds to an Rx beam of the apparatus.

In a twelfth aspect, in combination with one or more of the first aspect through the eleventh aspect, when the configuration indicates time restriction is enabled, the apparatus is prohibited from averaging over multiple CMR occasions, averaging over multiple IMR occasions, or a combination thereof, on different Tx beams of the base station.

In a thirteenth aspect, in combination with one or more of the first aspect through the twelfth aspect, when the configuration indicates time restriction is enabled, the apparatus is limited to averaging CMR, IMR, or a combination thereof, to one Tx beam of the base station. For example, if time restriction is configured for CMR, the apparatus is limited to averaging CMR to one Tx beam of the base station. As another example, if time restriction is configured for IMR, the apparatus is limited to averaging IMR to one Tx beam of the base station In a fourteenth aspect, in combination with one or more of the first aspect through the thirteenth aspect, the apparatus is further configured to perform a channel measurement based on the configuration, perform an interference measurement based on the configuration, or a combination thereof.

In a fifteenth aspect, in combination with one or more of the first aspect through the fourteenth aspect, the apparatus is further configured to average one or more CMRs.

In a sixteenth aspect, in combination with one or more of the first aspect through the fifteenth aspect, the apparatus if further configured to determine an RSRP based on the averaged one or more CMRs.

In a seventeenth aspect, in combination with the sixteenth aspect, the one or more CMRs is averaged in an L1, the one or more CMRs is periodic or semi-persistent, or a combination thereof.

In an eighteenth aspect, in combination with one or more of the first aspect through the seventeenth aspect, the apparatus if further configured to average one or more IMRs.

In a nineteenth aspect, in combination with the eighteenth aspect, the apparatus if further configured to determine an SINR based on the averaged one or more IMRs.

In a twentieth aspect, in combination with the nineteenth aspect, the one or more IMRs is averaged in an L1, the one or more IMRs is periodic or semi-persistent, or a combination thereof.

In one or more aspects, techniques for supporting a configuration for a measurement resource may include additional aspects, such as any single aspect or any combination of aspects described below or in connection with one or more other processes or devices described elsewhere herein. In a twenty-first aspect, supporting a configuration for a measurement resource may include an apparatus configured to determine a configuration for a CMR time restriction, an IMR time restriction, or a combination thereof. The apparatus is further configured to generate a message including a MAC-CE or DCI that indicates the configuration, and transmit the message. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-second aspect, in combination with the twenty-first aspect, the configuration includes a parameter that indicates whether the CMR time restriction is configured or not configured, the IMR time restriction is configured or not configured, or a combination thereof.

In a twenty-third aspect, in combination with the twenty-second aspect, the parameter includes a timeRestriction parameter. The parameter may be included in a CSI-report configuration field of a MAC-CE or DCI.

In a twenty-fourth aspect, in combination with one or more of the twenty-second aspect or the twenty-third aspect, the parameter includes a CMR parameter to enable CMR time filtering.

In a twenty-fifth aspect, in combination with the twenty-fourth aspect, the CMR parameter is includes in a CSI-report configuration field.

In a twenty-sixth aspect, in combination with one or more of the twenty-second aspect through the twenty-fifth aspect, the parameter includes an IMR parameter to enable IMR time filtering.

In a twenty-seventh aspect, in combination with the twenty-sixth aspect, the IMR parameter is included in a CSI-report configuration field.

In a twenty-eighth aspect, in combination with one or more of the twenty-first aspect through the twenty-seventh aspect, the configuration includes a sample number indicator that indicates a number of samples to average for the CMR time filtering, the IMR time filtering, or a combination thereof.

In a twenty-ninth aspect, in combination with one or more of the twenty-first aspect through the twenty-eighth aspect, the configuration indicates a number of CSI-RS resources or a number of CSI-RS slots for the UE to use to generate a report.

In a thirtieth aspect, in combination with one or more of the twenty-first aspect through the twenty-ninth aspect, the apparatus is configured to receive the report.

In a thirty-first aspect, in combination with one or more of the twenty-ninth aspect or the thirtieth aspect, the report includes a CSI report.

In a thirty-second aspect, in combination with one or more of the twenty-first aspect through the thirty-first aspect, the report includes an indication of an RSRP, an indication of an SINR, or a combination thereof.

In a thirty-third aspect, in combination with one or more of the twenty-first aspect through the thirty-second aspect, the configuration includes a beam indicator that indicates a Tx beam of the apparatus. The Tx beam of the apparatus may correspond to an Rx beam of the UE.

In a thirty-fourth aspect, in combination with one or more of the twenty-first aspect through the thirty-fourth aspect, when the configuration indicates time restriction is configured, the apparatus is prohibited from averaging over multiple CMR occasions, averaging over multiple IMR occasions, or a combination thereof, on different Tx beams of the apparatus.

In a thirty-fifth aspect, in combination with one or more of the twenty-first aspect through the thirty-third aspect, when the configuration indicates time restriction is configured, the UE is limited to averaging CMR, IMR, or a combination thereof, to one Tx beam of the apparatus.

In a thirty-sixth aspect, in combination with one or more of the twenty-first aspect through the thirty-fifth aspect, the apparatus is further configured to transmit one or more CMRs, one or more IMRs, or a combination thereof.

In a thirty-seventh aspect, in combination with the thirty-sixth aspect, the one or more CMRs is periodic or semi-persistent, the one or more IMRs is periodic or semi-persistent, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    receiving a medium access control-control element (MAC-CE) or downlink control information (DCI) that indicates a configuration for:
        a channel measurement resource (CMR) time restriction,
        an interference measurement resource (IMR) time restriction, or
        a combination thereof, wherein the configuration indicates a first number of samples to average for CMR time filtering, a second number of samples to average over IMR time filtering, or a combination thereof; and
    transmitting a report based on the configuration.

2. The method of claim 1, wherein the configuration includes a parameter that indicates whether:
    the CMR time restriction is configured or not configured;
    the IMR time restriction is configured or not configured; or
    a combination thereof.

3. The method of claim 1, wherein the configuration includes:
    a sample number indicator that indicates the first number of samples to average for CMR time filtering, the second number of samples to average for IMR time filtering, or the combination thereof;
    a beam indicator that indicates a transmit (Tx) beam of a base station, wherein the Tx beam of the base station corresponds to a receive (Rx) beam of the UE; or
    a combination thereof.

4. The method of claim 1, wherein the configuration indicates a number of channel state information reference signal (CSI-RS) resources or a number of CSI-RS slots for the UE to use to generate the report.

5. The method of claim 1, wherein, in response to the configuration indicating that time filtering is enabled:
    the UE is prohibited from averaging over multiple CMR occasions, averaging over multiple IMR occasions, or a combination thereof, on different transmit (Tx) beams of a base station; and
    the UE is limited to averaging CMR, averaging IMR, or a combination thereof, to one Tx beam of the base station.

6. The method of claim 1, further comprising:
    performing a channel measurement based on the configuration;
    performing an interference measurement based on the configuration; or
    a combination thereof; and wherein the report includes a channel state information (CSI) report.

7. The method of claim 1, further comprising:
averaging one or more CMRs;
determining a receive signal reference power (RSRP) based on the averaged one or more CMRs; and
wherein the one or more CMRs is averaged in a Layer 1 (L1), the one or more CMRs is periodic or semi-persistent, or a combination thereof.

8. The method of claim 1, further comprising:
averaging one or more IMRs;
determining a signal to interference and noise ratio (SINR) based on the averaged one or more IMRs; and
wherein the one or more IMRs is averaged in a Layer 1 (L1), the one or more IMRs is periodic or semi-persistent, or a combination thereof.

9. The method of claim 1, wherein the configuration includes a sample number indicator that indicates the number of samples to average for CMR time filtering, the number of samples to average over IMR time filtering, or a combination thereof.

10. The method of claim 1, wherein the configuration includes a beam indicator that indicates a transmit (Tx) beam of a base station, wherein the Tx beam of the base station corresponds to a receive (Rx) beam of the UE.

11. A user equipment (UE) comprising:
a memory storing processor-readable code; and
at least one processor coupled to the memory, the at least one processor configured to execute the processor-readable code to cause the at least one processor to:
receive a medium access control-control element (MAC-CE) or downlink control information (DCI) that indicates a configuration for:
a channel measurement resource (CMR) time restriction,
an interference measurement resource (IMR) time restriction,
or a combination thereof, wherein the configuration indicates a first number of samples to average for CMR time filtering, a second number of samples to average over IMR time filtering, or a combination thereof; and
initiate transmission of a report based on the configuration.

12. The UE of claim 11, wherein:
the configuration indicates a number of channel state information reference signal (CSI-RS) resources or a number of CSI-RS slots for the UE to use to generate the report, and
the configuration includes a parameter that indicates whether:
the CMR time restriction is configured or not configured;
the IMR time restriction is configured or not configured; or
a combination thereof.

13. The UE of claim 11, wherein the configuration includes
a beam indicator that indicates a transmit (Tx) beam of a base station, wherein the Tx beam of the base station corresponds to a receive (Rx) beam of the UE.

14. The UE of claim 11, wherein, in response to the configuration indicating that time filtering is enabled:
the UE is prohibited from averaging over multiple CMR occasions, averaging over multiple IMR occasions, or a combination thereof, on different Tx beams of a base station; and the UE is limited to averaging CMR, averaging the IMR, or a combination thereof, to one Tx beam of the base station.

15. The UE of claim 11, wherein the at least one processor is further configured to execute the processor-readable code to cause the at least one processor to:
perform a channel measurement based on the configuration;
perform an interference measurement based on the configuration; or
a combination thereof; and
wherein the report includes a CSI report.

16. The UE of claim 11, wherein the at least one processor is further configured to execute the processor-readable code to cause the at least one processor to:
average one or more CMRs;
determine a receive signal reference power (RSRP) based on the averaged one or more CMRs; and
wherein the one or more CMRs is averaged in a Layer 1 (L1), the one or more CMRs is periodic or semi-persistent, or a combination thereof.

17. The UE of claim 11, wherein the at least one processor is further configured to execute the processor-readable code to cause the at least one processor to:
average one or more IMRs;
determine a signal to interference and noise ratio (SINR) based on the averaged one or more IMRs; and
wherein the one or more IMRs is averaged in a Layer 1 (L1), the one or more IMRs is periodic or semi-persistent, or a combination thereof.

18. A method of wireless communication performed by a base station, the method comprising:
determining a configuration for:
a channel measurement resource (CMR) time restriction,
an interference measurement resource (IMR) time restriction,
or a combination thereof, wherein the configuration indicates a first number of samples to average for CMR time filtering, a second number of samples to average over IMR time filtering, or a combination thereof;
generating a message including a medium access control-control element (MAC-CE) or downlink control information (DCI) that indicates the configuration; and
transmitting the message.

19. The method of claim 18, wherein the configuration includes a parameter that indicates whether:
the CMR time restriction is configured or not configured;
the IMR time restriction is configured or not configured; or
a combination thereof.

20. The method of claim 18, wherein:
the configuration includes a sample number indicator that indicates the first number of samples to average for CMR time filtering, the second number of samples to average for IMR time filtering, or the combination thereof;
the configuration indicates a number of channel state information reference signal (CSI-RS) resources or a number of CSI-RS slots for a user equipment (UE) to use to generate a report;
the configuration includes a beam indicator that indicates a transmit (Tx) beam of the base station, wherein the Tx beam of the base station corresponds to a receive (Rx) beam of the UE; or
a combination thereof.

21. The method of claim 18, further comprising receiving a report, wherein the report includes an indication of a receive signal reference power (RSRP), an indication of a signal to interference and noise ratio (SINR), or a combination thereof, and wherein, in response to the configuration indicating that the time restriction is configured, a user equipment (UE) is prohibited from averaging over multiple CMR occasions, averaging over multiple IMR occasions, or a combination thereof, on different Tx beams of the base station.

22. The method of claim 18, wherein, in response to the configuration indicating that time restriction is configured, a user equipment (UE) is limited to averaging CMR, averaging IMR, or a combination thereof, to one Tx beam of the base station.

23. The method of claim 18, further comprising:
transmitting one or more CMRs;
transmitting one or more IMRs; or
a combination thereof,
wherein the one or more CMRs is periodic or semi-persistent, the one or more IMRs is periodic or semi-persistent, or a combination thereof.

24. A base station comprising:
a memory storing processor-readable code; and
at least one processor coupled to the memory, the at least one processor configured to execute the processor-readable code to cause the at least one processor to:
determine a configuration for:
a channel measurement resource (CMR) time restriction,
an interference measurement resource (IMR) time restriction, or
a combination thereof, wherein the configuration indicates a first number of samples to average for CMR time filtering, a second number of samples to average over IMR time filtering, or a combination thereof;
generate a message including a medium access control-control element (MAC-CE) or downlink control information (DCI) that indicates the configuration; and
initiate transmission of the message.

25. The base station of claim 24, wherein the configuration includes a parameter that indicates whether:
the CMR time restriction is configured or not configured;
the IMR time restriction is configured or not configured; or
a combination thereof.

26. The base station of claim 24, wherein:
the configuration includes a sample number indicator that indicates the first number of samples to average for the CMR time filtering, the second number of samples to average for the IMR time filtering, or the combination thereof;
the configuration indicates a number of channel state information reference signal (CSI-RS) resources or a number of CSI-RS slots for a user equipment (UE) to use to generate a report;
the configuration includes a beam indicator that indicates a transmit (Tx) beam of the base station, wherein the Tx beam of the base station corresponds to a receive (Rx) beam of the UE; or
a combination thereof.

27. The base station of claim 24, wherein the at least one processor is further configured to execute the processor-readable code to cause the at least one processor to receive a report, and wherein the report includes an indication of a receive signal reference power (RSRP), an indication of a signal to interference and noise ratio (SINR), or a combination thereof.

28. The base station of claim 24, wherein, in response to the configuration indicating that time restriction is configured:
a user equipment (UE) is prohibited from averaging over multiple CMR occasions, averaging over multiple IMR occasions, or a combination thereof, on different Tx beams of the base station; and
the UE is limited to averaging CMR, averaging over IMR, or a combination thereof, to one Tx beam of the base station.

29. The base station of claim 24, wherein the at least one processor is further configured to execute the processor-readable code to cause the at least one processor to:
initiate transmission of one or more CMRs;
initiate transmission of one or more IMRs; or
a combination thereof,
wherein the one or more CMRs is periodic or semi-persistent, the one or more IMRs is periodic or semi-persistent, or a combination thereof.

30. The base station of claim 24, wherein the at least one processor is further configured to execute the processor-readable code to cause the at least one processor to generate the message without sending a radio resource control (RRC) message.

* * * * *